(12) United States Patent
Robertson et al.

(10) Patent No.: US 6,213,030 B1
(45) Date of Patent: Apr. 10, 2001

(54) VOLATILE MATERIALS TREATMENT SYSTEM

(75) Inventors: Struan Glen Robertson, Paradise Drive; Edward Elliott Finsten, Gladesville, both of (AU)

(73) Assignee: Tox Free Systems (AU)

( * ) Notice: Subject to any disclaimer, the term of this patent is extended or adjusted under 35 U.S.C. 154(b) by 0 days.

(21) Appl. No.: 09/051,004

(22) PCT Filed: Oct. 4, 1996

(86) PCT No.: PCT/AU96/00628

§ 371 Date: May 3, 1999

§ 102(e) Date: May 3, 1999

(87) PCT Pub. No.: WO97/13594

PCT Pub. Date: Apr. 17, 1997

(30) Foreign Application Priority Data

Oct. 6, 1995 (AU) .................................................. PN 5857

(51) Int. Cl.[7] ................. F23G 5/00; F23J 3/00; F23J 15/00; F23C 9/00; F27D 17/00
(52) U.S. Cl. ................. 110/246; 110/259; 110/242; 110/203; 110/204; 110/216; 110/226; 432/67; 432/72
(58) Field of Search ................. 110/246, 242, 110/203, 204, 216, 346, 226, 206, 207, 259; 55/484, 320, 322, 324, 523; 95/268, 286; 266/156; 432/67, 66, 71, 72

(56) References Cited

U.S. PATENT DOCUMENTS

| 3,792,671 | * | 2/1974 | Woods | 110/8 R |
|---|---|---|---|---|
| 4,052,266 | * | 10/1977 | Griffith | 201/15 |
| 4,563,246 | * | 1/1986 | Reed et al. | 202/100 |
| 4,934,286 | * | 6/1990 | Fowler | 110/346 |
| 5,207,176 | * | 5/1993 | Morhard et al. | 110/246 |
| 5,220,873 | * | 6/1993 | Milsap | 110/240 |
| 5,256,175 | * | 10/1993 | Zievers et al. | 55/302 |
| 5,318,606 | * | 6/1994 | Giebel et al. | 55/269 |
| 5,425,317 | * | 6/1995 | Schaub et al. | 110/346 |
| 5,579,704 | * | 12/1996 | Mansur | 110/185 |
| 5,655,465 | * | 8/1997 | Robertson | 110/346 |

* cited by examiner

Primary Examiner—Denise L. Ferensic
Assistant Examiner—Th. B. Rinehart
(74) Attorney, Agent, or Firm—Cesari and McKenna

(57) ABSTRACT

Apparatus for the treatment of volatile material(s) in contaminated material(s) including a retort assembly which includes a rotatable retort disposed at least partially within a combustion chamber with a heater to indirectly heat the contents of the rotatable retort. A feeder feeds the contaminated material(s) to the retort. The apparatus further includes a pathway for passing contaminated material(s) to the retort and a conduit for passing the combustion gases from an afterburner to the retort assembly to provide additional heat for heating the contaminated material in the retort. The apparatus may also include a high temperature filter which can filter the volatiles before entering the afterburner.

13 Claims, 10 Drawing Sheets

VOLATILE MATERIALS TREATMENT SYSTEM

BACKGROUND OF THE INVENTION a) Field of the Invention

This invention relates to the treatment of volatile contaminants. The invention is particularly suitable for, but not limited to, the removal of contaminants from solids and liquids.

The contaminants may include, but are not limited to, petroleum products (eg. petrol, oils, greases); phenols; coaltar; cyanide; pesticides; PCB's; HCB's, organochlorine pesticides and arsenics.

The treatment of contaminated soils and liquid wastes is a worldwide problem. Often, the contaminated soils or liquids are simply removed and transferred to a toxic waste dump or pond. This does no more than move the problem. For contaminants such as PCB's, the environmental protection authorities around the world specify strict conditions for their disposal in very high temperature incinerators, eg. found in the vessel "Vulcanus".

b) Description of the Prior Art

International Patent Application No. PCT/AU93/00646 (International Publication No. WO 94/15150) (Robertson) discloses a stationery retort where toxic waste and other contaminants are removed from soil, the soil being agitated and being brought into contact with the retort walls to cause the wastes and contaminants to be desorbed. The retort has proved successful in the removal of toxic waste and contaminants from many types of soil.

SUMMARY OF THE INVENTION

It is an object of the present invention to provide improved methods and apparatus for use in removing volatile contaminants from solids or liquids.

According to one aspect of the present invention there is provided a method for the treatment of volatile material(s) in contaminated material(s) including the steps of:

feeding the contaminated material(s) to a retort assembly which includes a rotatable retort at least partially disposed within a combustion chamber which is heated by heating means;

causing the contaminated material(s) to contact the wall (s) of the retort to cause the volatile material(s) to be given off as gases;

discharging the treated material from the retort;

transferring the gases to an afterburner for combustion; and returning the combustion gases from the afterburner to the retort assembly to provide assistance in heating the contaminated material(s) being treated in the retort.

According to another aspect of the present invention there is provided apparatus for the treatment of volatile material(s) in contaminated material(s) including a retort assembly which includes a rotatable retort disposed at least partially within a combustion chamber with heating means to indirectly heat the rotatable retort; said rotatable retort include a feed end through which the contaminated material(s) are fed to the retort and a discharge end from which the materials are discharged from the retort; an afterburner; means to transfer the volatile material(s) given off as gases to the afterburner for combustion; and means for passing the combustion gases from the afterburner to the retort assembly to provide additional heat for use in the heating of contaminated material(s) in the retort.

Preferably, the apparatus includes a high temperature filter through which the gaseous volatile material(s) pass after leaving the retort and prior to entering the afterburner.

According to yet another aspect of the present invention there is provided a high temperature filter which is suitable for use but not limited to the treatment of volatile gaseous contaminated material, the filter including a main body having first and second chambers therein which chambers when the filter is in its operative position include an upper region and a lower region, an opening providing communication between the chambers, said opening being at the lower region of the chambers, an inlet for delivering gaseous contaminated material to the first chamber in the upper region thereof, an outlet for discharging the gaseous material from the second chamber, a solids collection zone adjacent the opening, a solids discharge outlet for discharging solids from the solids collection zone, a baffle opposite to and paced from the inlet upon which incoming gases impinge and filter means for filtering the gaseous material passing out of the second chamber via the outlet.

According to another aspect of the present invention there is provided a retort for use in the treatment of volatile material, the retort including a cylindrical body which is mounted for rotation about its longitudinal axis, said body having an infeed end and an outlet end, a combustion chamber, said cylindrical body being at least partially located within the combustion chamber, a plurality of balls or like elements disposed within the cylindrical body arranged to interact with contaminated material when the cylindrical body is rotating to break down the material and dislodge carbonised material which may form on the internal wall of the cylindrical body. The retort is particularly suitable for use in apparatus of the type described herein.

Preferably the retort includes a cage within the cylinder which retains the balls in the region of the wall of the cylindrical body. Preferably, the balls are arranged in groups, the groups being at spaced intervals along the interior of the cylindrical body. The cage includes spaced apart peripherally extending members which are adapted to assist in retaining the balls in each group at a particular location within the cylindrical body. Preferably, the balls are made of ceramic material. Preferably, the cage is mounted for rotation in the opposite direction to the cylindrical body.

In one embodiment of the invention the combustion gases are passed through the interior of the retort. In another embodiment the combustion gases are passed to the heating means.

When the contaminated material to be treated is in the form of solids, the solids are preferably passed through a grizzly or sieve prior to entering the retort to remove oversized material. If desired the solids may in addition to or alternatively to the above be passed through a mill prior to entering the retort so as to reduce the particle or granule size of the solids.

When the contaminated material is in the form of liquid, the water content of the liquid is preferably reduced prior to entering the retort. To this end the liquids may be preheated to boil off the water prior to entering the retort.

Preferably, the rotary retort rotates about an axis inclined at a small angle to the horizontal and is substantially surrounded by a combustion chamber to enable indirect heating of the retort.

Preferably, the combustion gases pass through a scrubber before being released into the atmosphere after passing through the retort. The gases from the high temperature filter may be passed through a condenser, where the condensate contains hydrocarbon fractions such as fuel oil and lubrication oil fractions.

In the high temperature filter according to the invention, the baffle is preferably defined by a wall which separates the said first and second chambers. Preferably, the wall extends from an upper internal wall of the chambers and terminates at a point spaced from a lower internal wall of the chambers, the space between the free end of the wall and the lower internal wall of the filter defining the opening. The wall may have fins thereon.

Preferably, the discharge outlet comprises a plurality of outlet ports in the upper wall of said second chamber. Preferably, the filter means comprises a plurality of ceramic candles, each ceramic candle being associated with a respect outlet, the ceramic candles extending into the second chamber.

There may further be provided a gas collecting chamber for receiving the gaseous material from the outlets and a discharge outlet for discharging the gaseous material from the gas collecting chamber. Fan suction means may be provided for drawing the gaseous material from the second chamber through the outlets.

The filter may further include pulsing means for delivering a gas under pressure to the filter means in the opposite direction of normal flow for cleaning the filter means. Preferably, the gas used in the pulsing means is nitrogen.

A heat jacket is preferably provided which at least partially surrounds the main body of the filter.

A further embodiment of the invention is particularly suited for the treatment of material containing organochlorine pesticides such as DDT, DDE and DDD and various arsenic based compounds. Such material is found in soil from cattle dip sites.

According to this aspect of the present invention there is provided a method for treatment of volatile material(s) in contaminated material(s) including organochlorine pesticides and arsenic based compounds including the steps of:

feeding the contaminated material(s) to a retort assembly which includes a rotatable retort at least partially disposed within a combustion chamber which is heated by heating means;

causing the contaminated material(s) to contact the wall(s) of the retort to cause the volatile material(s) to be given off as gases;

discharging the treated material from the retort into a high temperature filter;

thereafter transferring the gases to an afterburner for combustion and at the same time introducing water vapour into the afterburner.

According to yet another aspect of the present invention there is provided apparatus for treatment of volatile material(s) in contaminated material(s) including organochlorine pesticides and arsenic based compounds including a retort assembly which includes a rotatable retort having an infeed end through which material is fed to the retort and an outlet, the retort being at least partially disposed within a combustion chamber which is heated by heating means, whereby in use, the contaminated material(s) is caused to contact the wall(s) of the retort to cause the volatile material(s) to be given off as gases;

a high temperature filter which receives the material from the retort, an afterburner for combustion of the gases and means for introducing water vapour into the afterburner.

In this particular process the contaminated material is preferably firstly pretreated to remove water from the material. This may be done by the use of a preheater. The material is then transferred to a retort where the contaminant compounds are vaporised. The contaminants in the gas stream so formed are then transferred to a high temperature filter which may be of the type described earlier where further particulate matter is separated from the gas. The remaining gaseous component is transferred to an afterburner. The afterburner thermally destructs the organochlorine pesticides to produce simple products of combustion and hydrogen chloride gas. The arsenic component of the gas will pass through the afterburner primarily as arsenic trioxide.

If desired water vapour which may be conveniently drawn from the preheater is fed into the afterburner. The introduction of the water vapour causes a water/gas reaction which assists in the production of hydrogen chloride and arsenates.

The gas stream then passes to a condenser wherein the gas is rapidly cooled so as to condense the arsenates for collection as particulate matter. After the gas stream leaves the condenser calcium carbonate can be added to the stream to neutralise the hydrogen chloride.

The gas can be finally passed through a dust collector device whereafter the gas can pass to atmosphere.

As mentioned earlier the gases leaving the afterburner are cooled so as sublimate (condense) the arsenic and arsenic trioxide. Two alternative systems are envisaged 1. indirect air cooled; or
2. evaporative cooling through injection of water into the gas stream.

The gas stream leaving the afterburner is cooled to preferably about 110° C. in the condenser and then may be dosed with calcium carbonate ($CaCO_3$) (lime). The calcium carbonate reacts with the constituents of the gas stream to neutralise the hydrochloric acid and absorb moisture in the gas stream. The lime assists in minimising moisture problems on the filter bags, and can be collected in a dust collection bin.

The dust collector which may be in the form of a baghouse will remove the particulate arsenic trioxide which condenses below at approximately 120° C. and collects on the filter media. The gas stream will exit the baghouse at approximately 100° C. and be vented to atmosphere. An auxiliary fan on the baghouse will be used in conjunction with the high temperature filter fan in order to overcome the additional pressure loss in the system. The fans will be balanced using dampers in the system. The contaminated particulate (arsenic trioxide, spent lime) can be collected in plastic lined 200 L drums for disposal at authorised landfills.

BRIEF DESCRIPTION OF THE DRAWINGS

To enable the invention to be fully understood, preferred embodiments of the invention in its various aspects will now be described with reference to the accompanying drawings in which.

DESCRIPTION OF THE PREFERRED EMBODIMENTS

Figure 1:
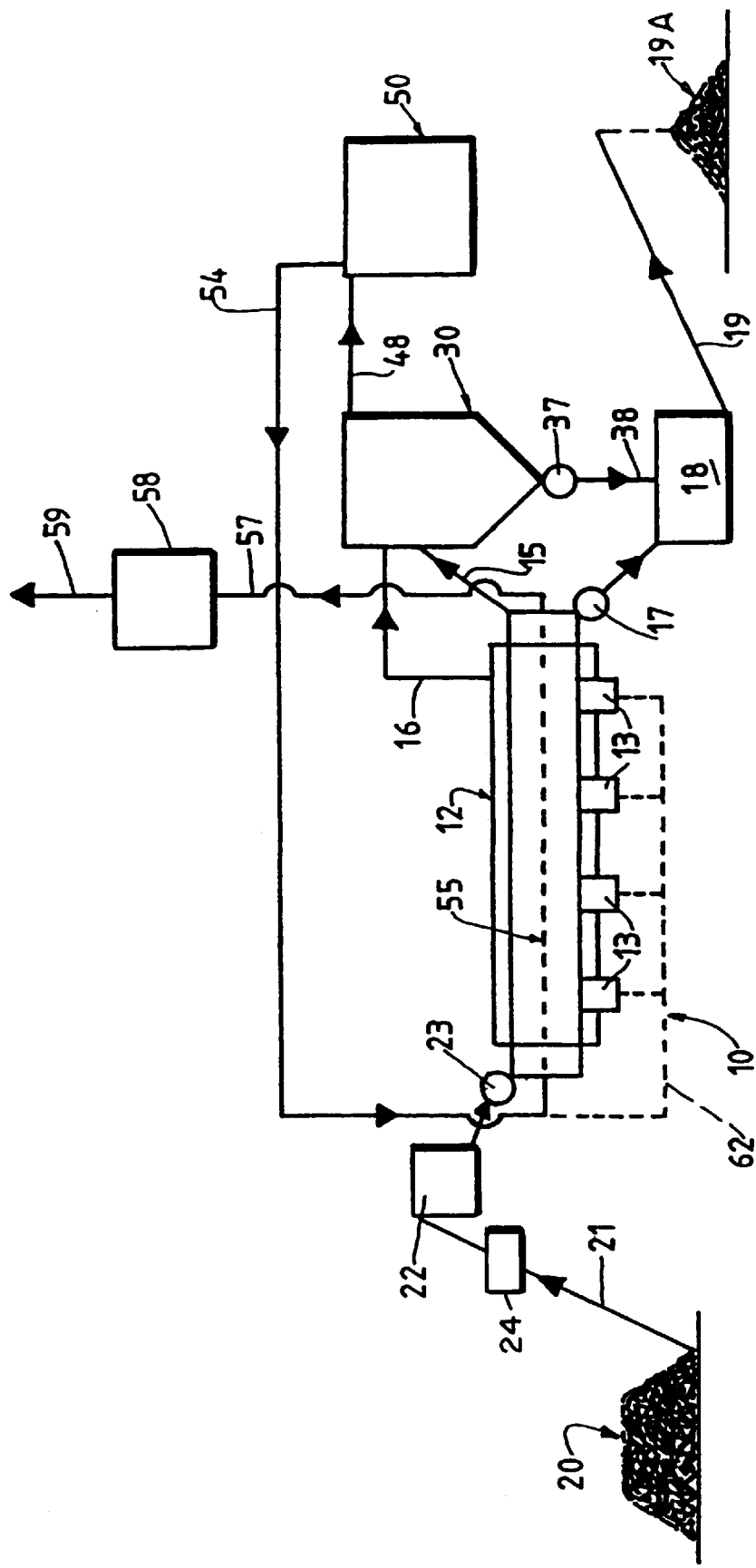
FIG. 1 is a schematic circuit diagram of a first embodiment for the treatment of contaminated solids.
Figure 2:
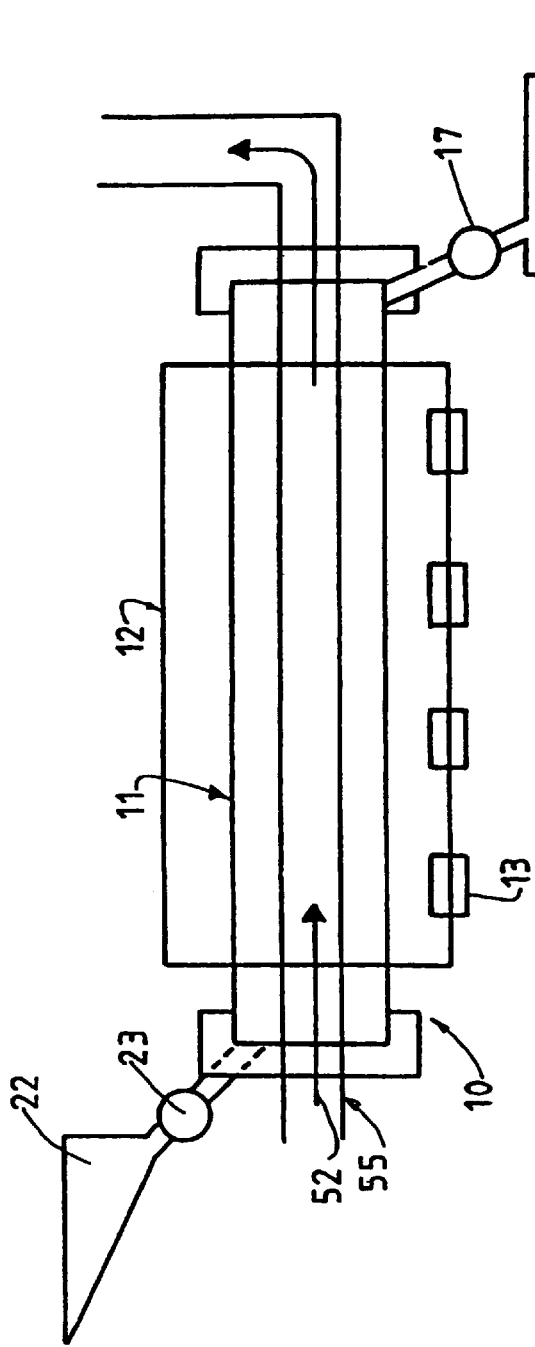
FIG. 2 is a schematic view of the retort of the first embodiment.
Figure 3:
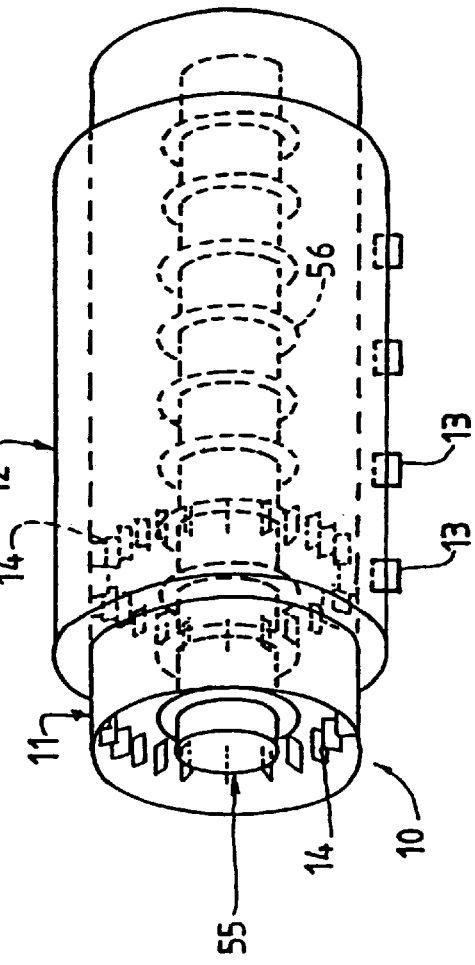
FIG. 3 is a more detailed schematic view of the retort of the first embodiment.

Referring to FIGS. 1–3, the rotary retort 10 has a cylindrical retort wall 11 rotatably journalled within a combustion chamber 12 heated by a plurality of burners 13 to provide indirect heating to the interior of the retort 10.

Ceramic seals form an airproof seal between the moving retort wall 11 and the fixed ends of the combustion chamber 12 (or of a support structure for the retort), and also act as an explosion vent in case of a volatile mix release caused by oxygen in the retort. (Preferably, a nitrogen purge is provided for the retort to prevent the oxygen levels becoming dangerous.)

As shown in FIG. 3, fins, blades or the like 14 are provided on the inner face of the retort wall 11 to increase the agitation of materials passing through the retort and to improve the heat transfer from the retort wall 11 to the materials.

Contaminated solids 20 are transferred via conveyor 21 to a mill 24 and then a grizzly 22 where oversized particles are removed. The acceptable particles are fed to the interior of the retort 10 via a rotary valve 23. As the contaminated solids move through the retort 10, volatile contaminants are given off as gases and are transferred via a gas line 15 to a high temperature filter 30 to be hereinafter described in more detail. The high temperature filter 30 is heated by the combustion gases from the combustion chamber 12 (being transferred via a line 16).

A rotary valve 17 discharges the treated solids to a product bin 18 and a conveyor 19 may be provided to transfer the treated solids from the product bin 18 to a dump pile 19A.

Figure 4:
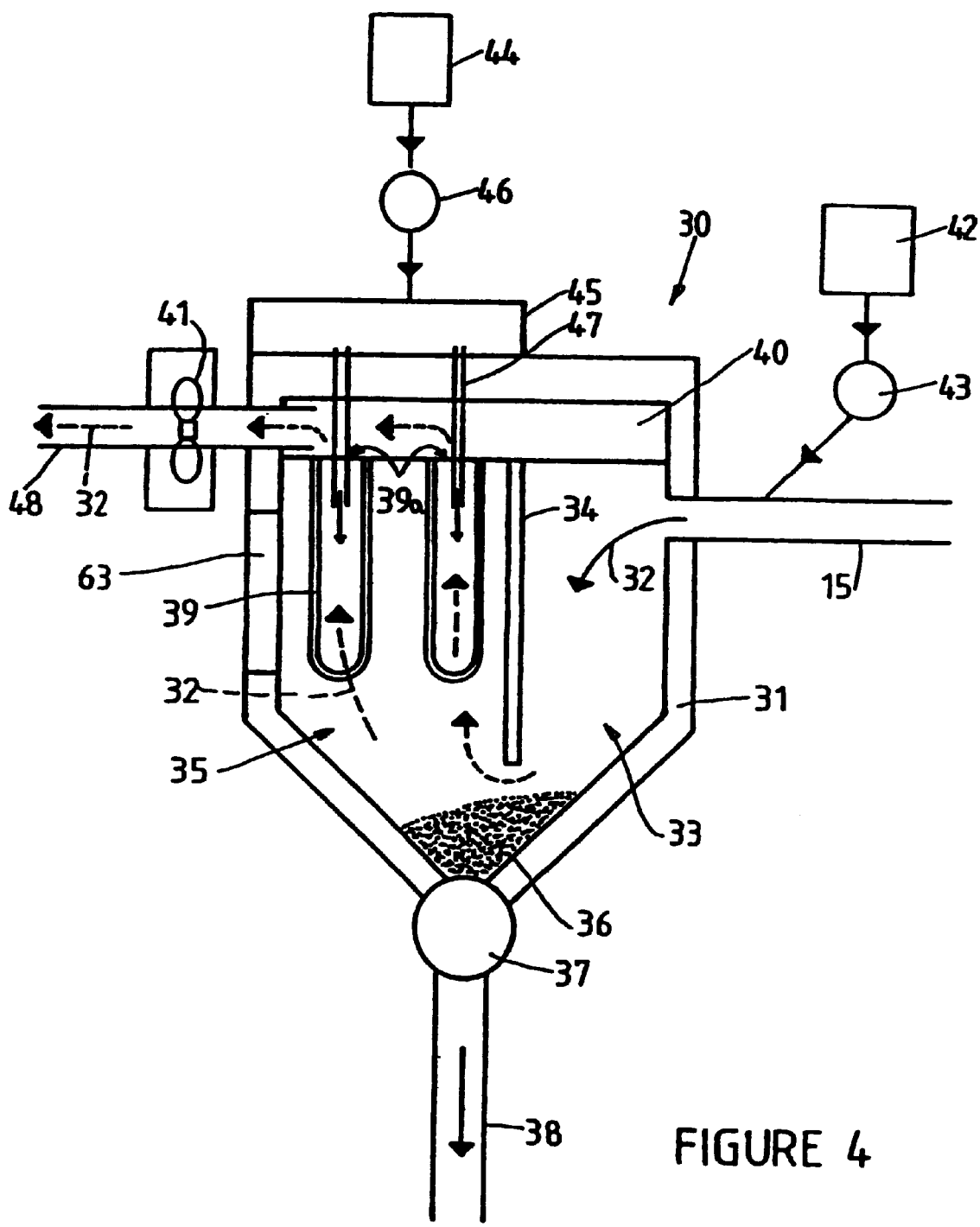
FIG. 4 is a schematic sectional side view of a high temperature filter according to the present invention.

Referring now to FIG. 4, the high temperature filter 30 is maintained above 500° C. above the combustion gases from the retort being fed via line 16 to a heat jacket 31 to prevent condensation of the volatile gases 32. The volatile gases enter a first chamber 33 and impinge on a wall 34 which acts as a baffle and separates the first chamber 33 from a second chamber 35. The wall 34 may have fins or plates thereon for the transfer of heat as well as to slow the gas stream down. As the volatile gases 32 sharply change path when passing from the first chamber 33 to the second chamber 35, most of the particulates 36 in the volatile gases 32 collect at the bottom of the high temperature filter 30 and can be selectively discharged by a rotary valve 37 and line 38 to the product bin 18. The combustion gases 32 then pass through ceramic candles 39 which capture particles down to −1 micron. The candle outlets 39a (FIG 4.) constitute outlet ports from chamber 35. The interiors of the ceramic candles 39 are connected to a plenum or chamber 40 and the volatile gases 32 are drawn from the plenum by a suction fan 41. The suction fan generates a partial vacuum in the high temperature filter 30 (and the retort 10) and assists in causing the ceramic seals to seal against the ends of the retort wall 11. An explosion vent in the form of a door 63 may be provided in the wall of the filter the door being arranged to open in the event of an explosion.

To prevent the oxygen level in the high temperature filter 30 reaching dangerous levels, sensor means (not shown) monitor the oxygen levels and if required, nitrogen from a supply tank 42 is injected into the line 15 via one or more nozzles connected to a valve 43.

To remove the particulates 36 which tend to coat the exterior of the ceramic candles 39, an air compressor 44 is connected to a manifold 45 via a valve 46. A respective pipe 47 extends from the manifold 45 into the interior of each ceramic candle 39 and sensor means (not shown) which monitor the gas flow through the ceramic candles, operate the valve 46 so that a blast of air is injected into the interior of the ceramic candles, via the pipes 47 to cause a counter-current flow to the flow of the volatile gases 32 to dislodge the particulates from the candles for collection in the bottom of the high temperature filter 30.

Figure 9:
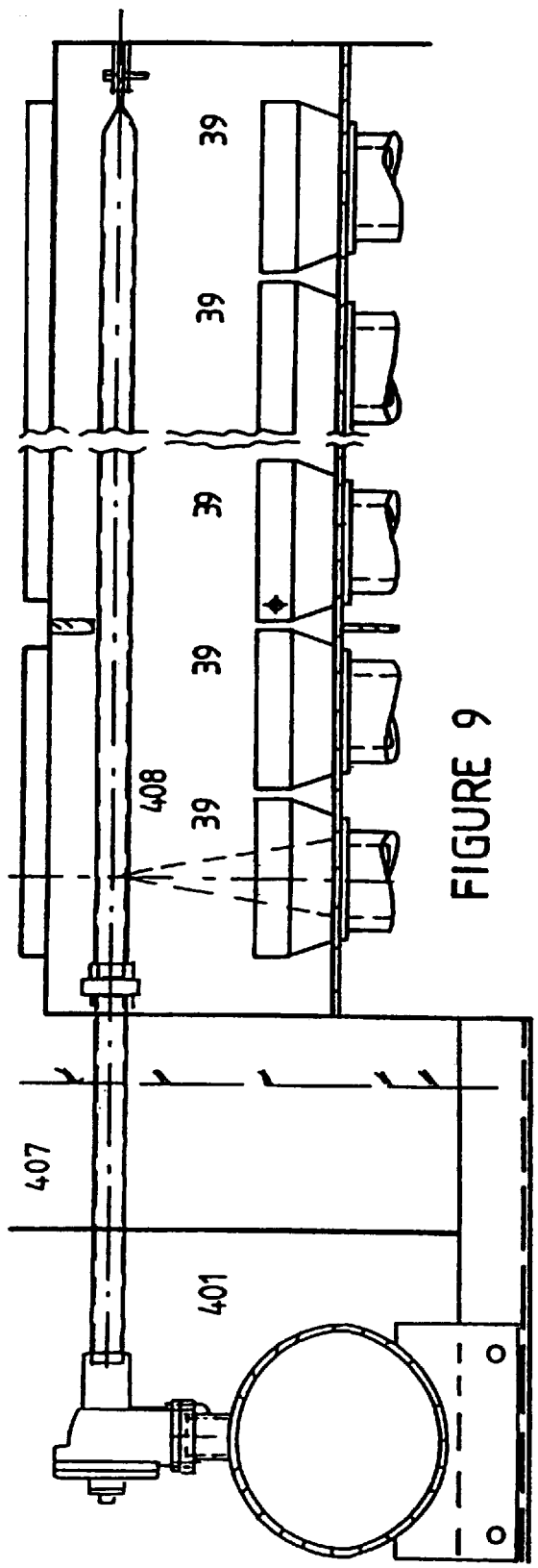
FIG. 9 is a schematic side elevation of a part of a high temperature filter according to another form of the invention.
Figure 10:
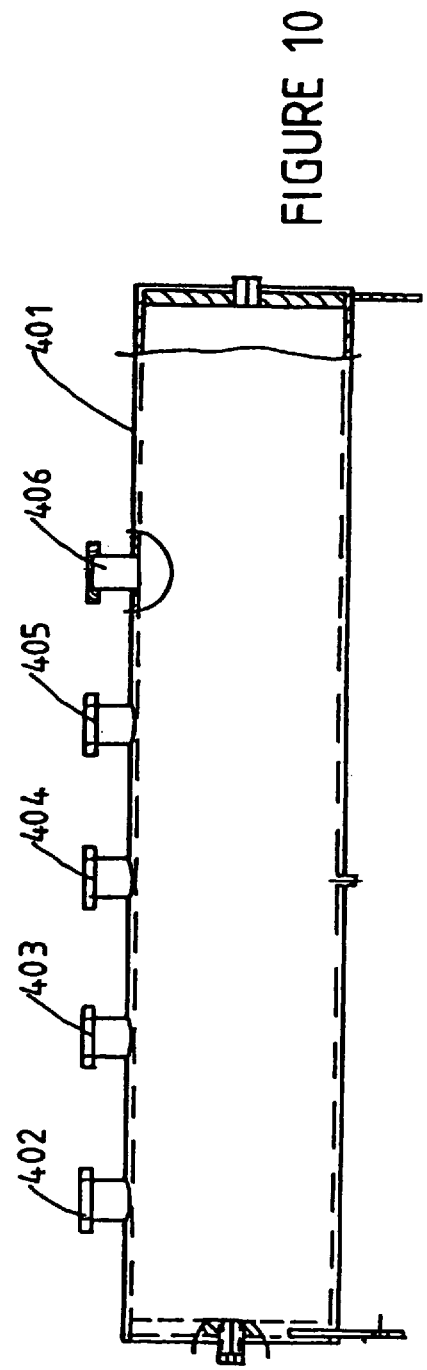
FIG. 10 is a side elevation of a manifold as shown in FIG. 9.

FIGS. 9 and 10 show a modified form of apparatus for introducing nitrogen into the high temperature filter as well as for removing the particles from the candles. In the apparatus as shown nitrogen is fed from a manifold 401 having a plurality of outlets 402 to 406. Each outlet is connected to a transfer tube 407 which extends into the filter at a position above the candles 39. The tube has a series of downwardly facing holes 408 each hole being associated with a respective candle. The arrangement is such that a blast of nitrogen can be directed downwardly to clear the candles and at the same time deliver nitrogen to the filter.

Figure 5:
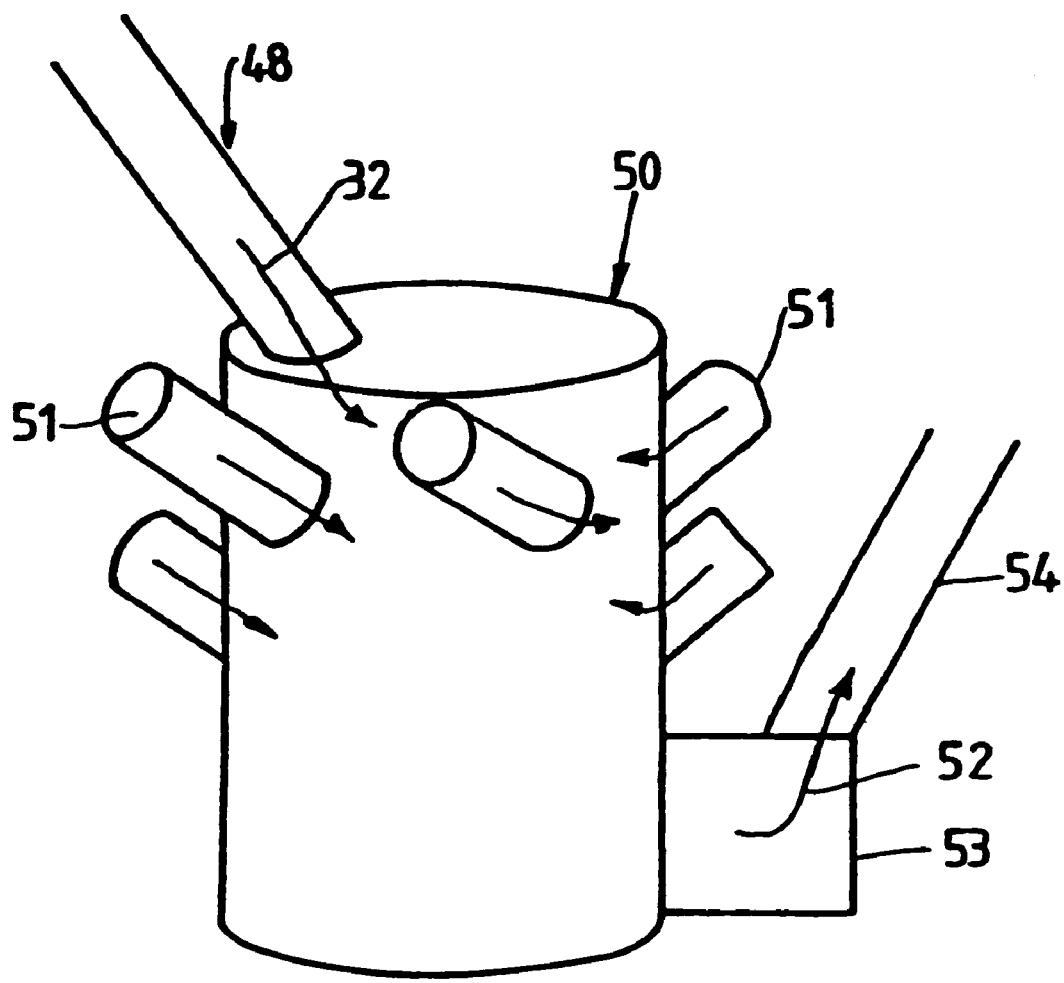
FIG. 5 is a schematic side view of an afterburner for use in the present invention.

The volatile gases 32 are conveyed via a line 48 to an afterburner 50 (see FIG. 5) in which combustion air is injected via a number of inclined injection pipes 51 to create a vortex for efficient combustion of the volatile gases. In one embodiment the combustion gases 52 from the afterburner pass through a plenum 53 to a line 54 which is connected to a pipe or conduit 55 extending through the interior of the retort 10. In another embodiment the gases can pass along line 54 and instead of passing through the retort can be fed to the burners 13 as shown by dash line 62 in FIG. 1.

The pipe 55 has a plurality of helical flights 56 to further promote the agitation of the aminated solids 50 in the retort 10, and to promote the transfer of heat from the combustion gases to the solids. As shown in FIG. 1, the flow of the combustion gases 52 from the afterburner is concurrent with the flow of solids through the retort 10 and the heat from the combustion gases 52 reduces the heat requirements for the retort provided by the burners 13, thereby reducing the input energy demand and cost. (This means that the volatile contaminants in the soil are used to provide a portion of the energy demands for the treatment of the soil and so the volatile materials, which normally have a highly negative economic value, are given at least a partial positive economic value.) From the pipe 55, a line 57 transfers the combustion gases 52 to a scrubber 58 and thereby to the end stack 59 for release to the atmosphere.

Figure 6:
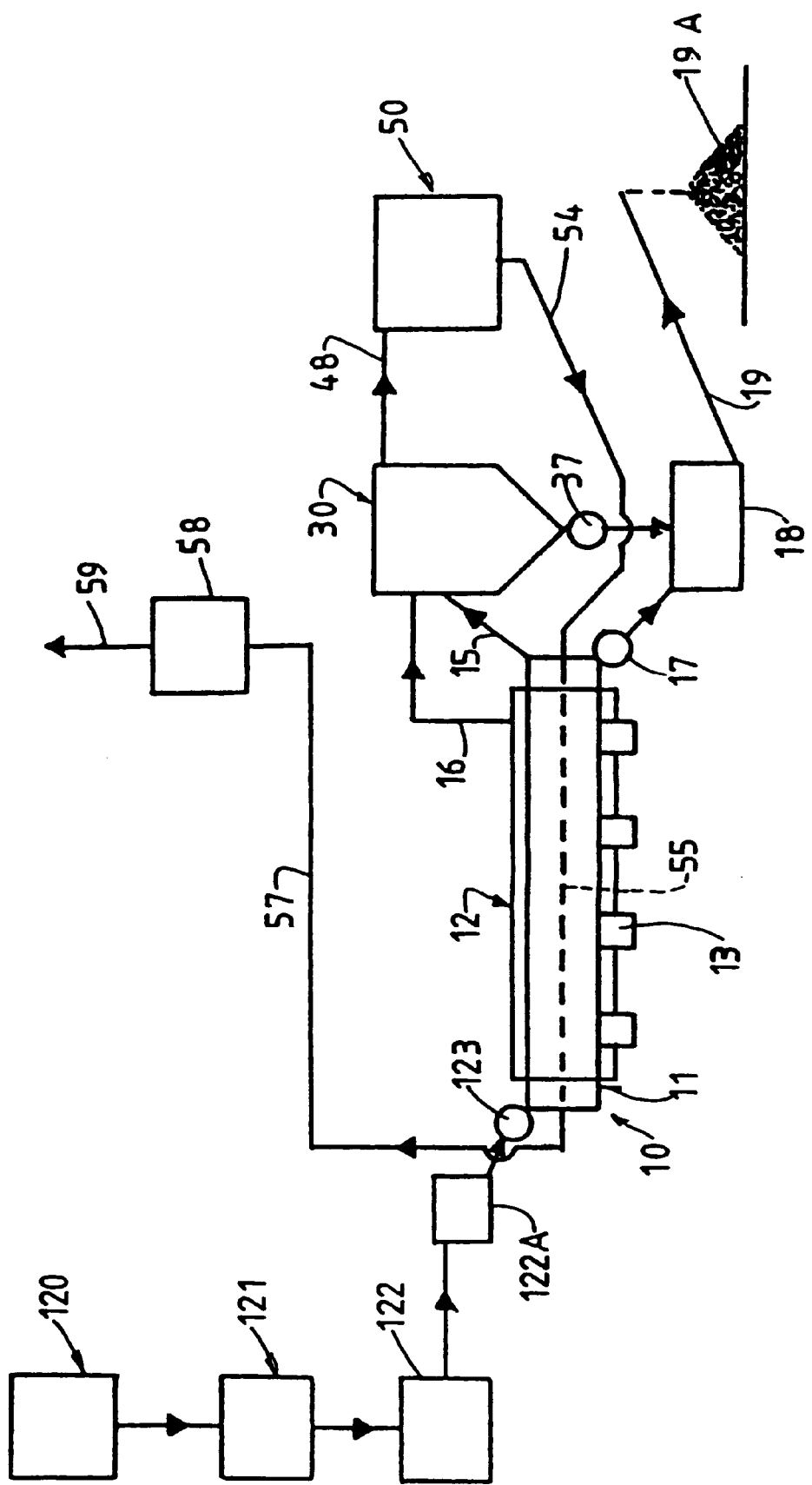
FIG. 6 is a schematic view of a second embodiment for the treatment of contaminated liquids.

Referring now to a second embodiment of FIG. 6, liquid contaminants from a pond 120 are fed to a concentrator 121 where the water content of the liquids is minimised and the concentrated contaminated liquid is transferred to a tank 122. The contaminated liquid is pumped via a pump 122a to spray nozzles 123 which inject the contaminated liquid into the retort 10. The contaminated liquid comes into contact with the interior of the retort wall 11 and the conduit 55 to cause the volatile contaminants to be given off as gases as hereinbefore described and any non-volatile solids are discharged via rotary valve 17 to the product bin 18.

It will be noted that line 54 connects the afterburner 50 to the conduit 55 so that the flow of combustion gases 52 from the afterburner is countercurrent to the flow of the contaminated liquids through the retort 10.

Figure 7:
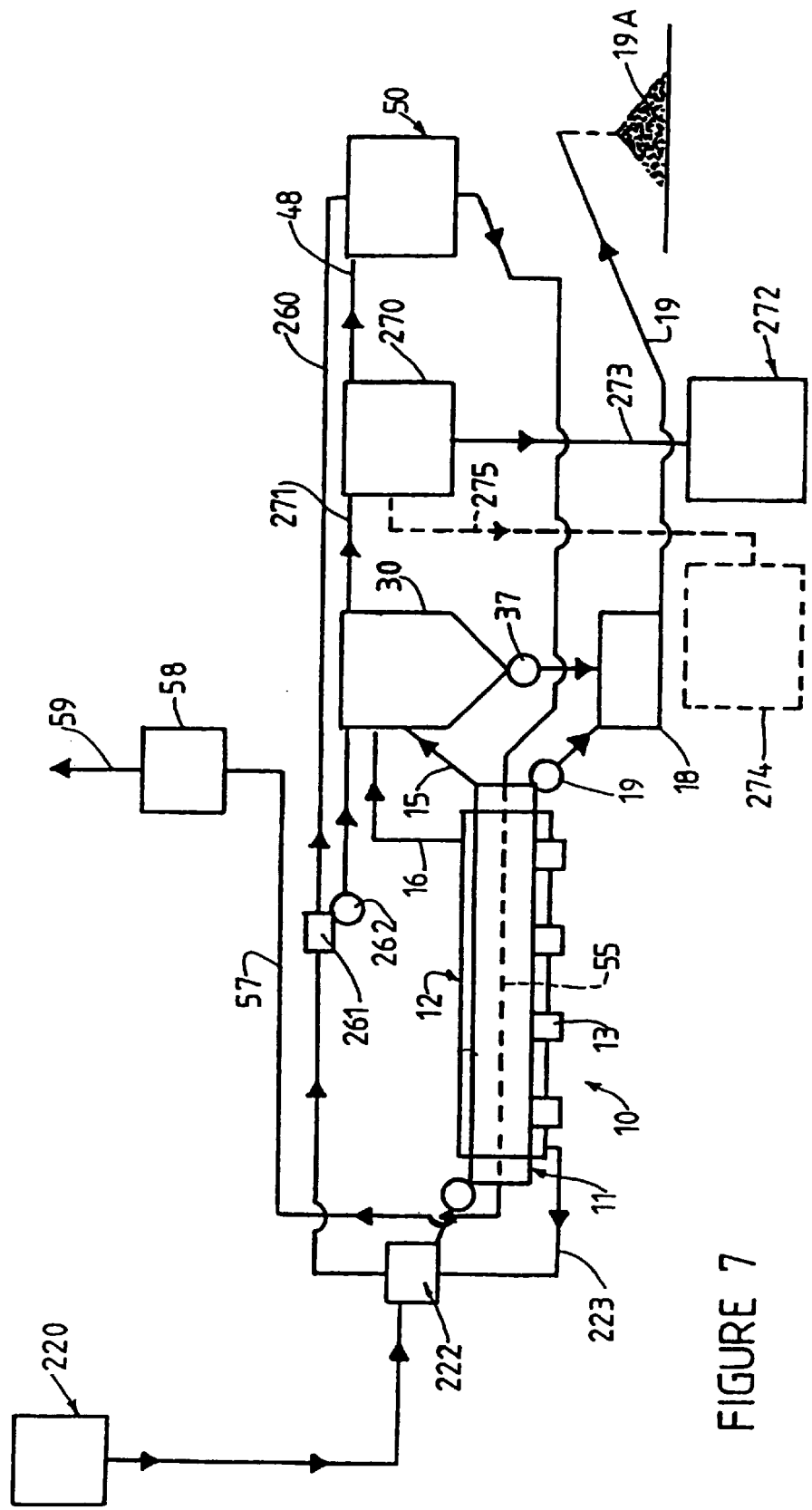
FIG. 7 is a schematic view of a third embodiment for the treatment of contaminated liquids.

In the embodiment of FIG. 7, which is particularly suitable for the treatment of refinery tank bottoms, the contaminated refinery products containing, eg. 50–80% water, is pumped from a refinery tank 220 to a preheater 222 where the water and light hydrocarbon fraction(s) are boiled off at, eg. 120° C. plus and fed by line 260 to the afterburner 50. A hot filtering device 261 removes particulates from the water/gas stream and feeds them to the high temperature filter 30 via a rotary valve 262. The concentrated liquid from the preheater 222 is sprayed into the retort 10 as hereinbefore described. The preheater 222 is heated by combustion gases from the retort 10 via line 223.

From the retort, the non-volatile solids are discharged via rotary valve 17 to the bin 18, and the volatile gases are transferred to the high temperature filter 30. The volatile gases are transferred from the filter 30 to a condenser 270 via line 271 at a temperature of, eg. 500° C. The gases are cooled and the condensate is collected as fuel oil, which is drawn off to tank 272 via line 273. By arranging the Condenser 270 as a "fractional distillation unit", the condensate may be separated into a lubrication oil component (drawn off at, eg. 300–500° C.) to tank 274 via line 275, and a diesel substitute component (at, eg. 200–300° C.) via line 273 to tank 272.

The remaining volatiles from the condenser 270 are fed to the afterburner 50 via line 48. These volatiles, and the 222 water/light HC fraction from the preheater, may be burnt at, eg. 1200° C. with a residence time of, eg. 20 seconds. The energy from the afterburner 50 is recycled to heat the preheater 223 and the high temperature filter 30. The high temperature filter and pre-treatment feed and product lines are surrounded by a heating jacket to maintain temperature and the heat is sourced from the combustion chamber excess gases.

This method markedly reduces the costs of treating the refinery tank bottoms, and the costs are offset by the recovery of the valuable condensates(s).

Figure 8:
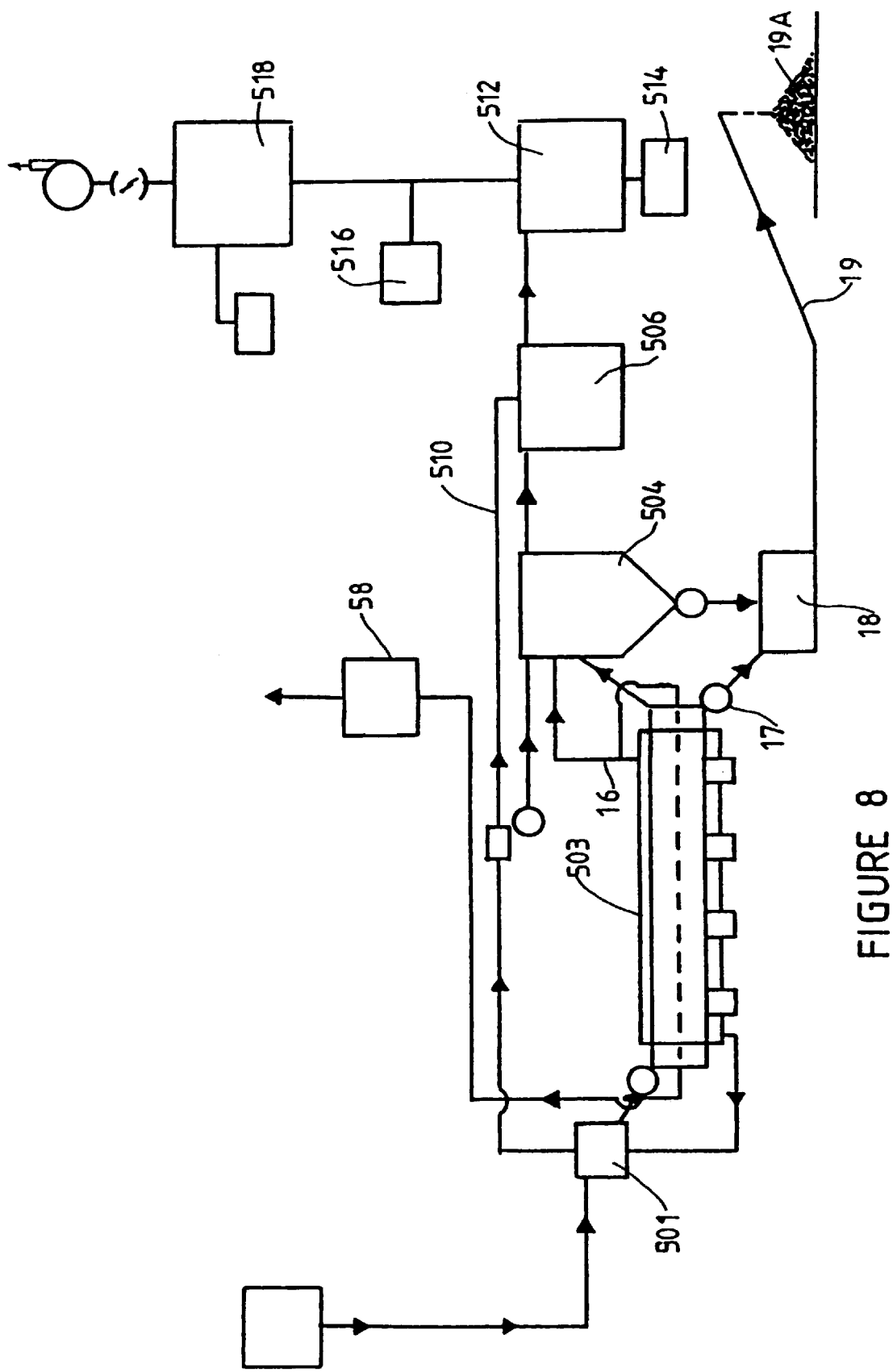
FIG. 8 is a schematic view of a further embodiment particularly suited for the treatment of organochlorine pesticides and arsenic compounds.

FIG. 8 shows a further embodiment of the invention which is particularly suited for the treatment of material containing organochlorine pesticides such as DDT, DDE and DDD and various arsenic based compounds. Such material is found in soil from cattle dip sites.

In this particular arrangement the contaminated material is preferably firstly pretreated to remove water from the material. This may be done by the use of a preheater 501. The material is then transferred to retort 503 where the contaminant compounds are vaporised. The contaminants in the gas stream so formed are then transferred to high temperature filter 504 which may be which may be of the type described earlier where further particulate matter is separated from the gas. The remaining gaseous component is transferred to afterburner 506. The afterburner thermally destructs the organochlorine pesticides to produce simple products of combustion and hydrogen chloride gas. The arsenic component of the gas will pass through the after burner primarily as arsenic trioxide.

If desired water vapour which may be conveniently drawn from the preheater 501 is fed into the afterburner 506 via line 510. The introduction of the water vapour causes a water/gas reaction which assists in the production of hydrogen chloride and arsenates.

The gas stream then passes to condenser 512 wherein the gas is rapidly cooled so as to condense the arsenates for collection as particulate matter at vessel 514. After the gas stream leaves the condenser 512 calcium carbonate can be added to the stream via hopper 516 to neutralise the hydrogen chloride.

The gas can be finally passed through a dust collector device 518 whereafter the gas can pass to atmosphere. The dust collector 518 which may be in the form of a baghouse will remove the particulate arsenic trioxide which condenses below at approximately 120° C. and collects on the filter media. The gas stream will exit the baghouse at approximately 100° C. and be vented to atmosphere. An auxiliary fan on the baghouse will be used in conjunction with the high temperature filter fan in order to overcome the additional pressure loss in the system. The fans will be balanced using dampers in the system. The contaminated particulate (arsenic trioxide, spent lime) will be collected in plastic lined 200 L drums for disposal at authorised landfills.

Figure 12:
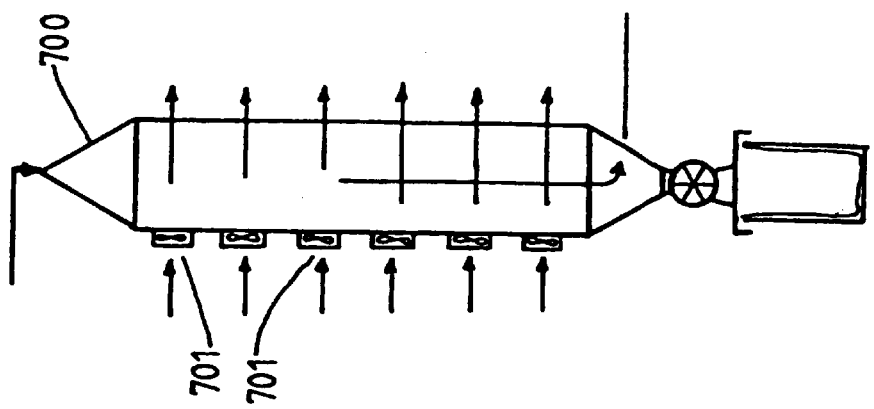
FIG. 12 is a schematic side elevation of another form of condenser which can be used in the embodiment of FIG. 8.
Figure 11:
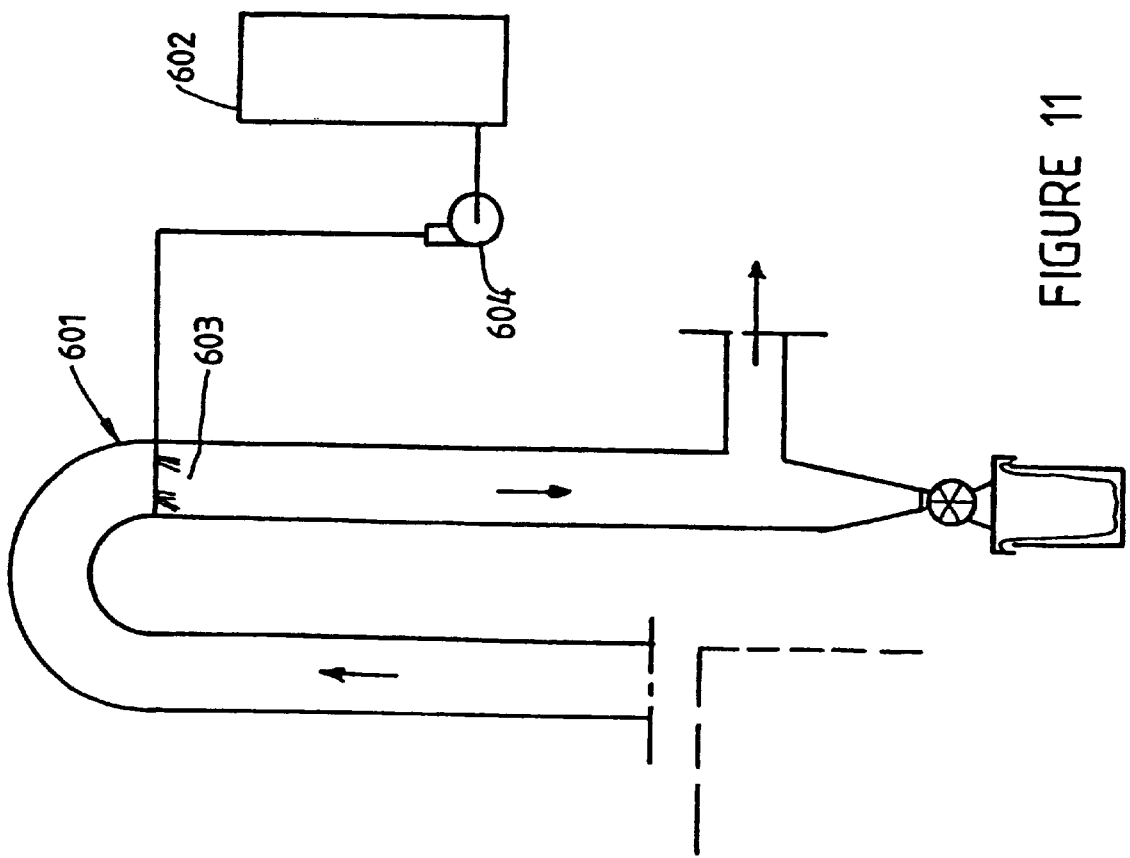
FIG. 11 is a schematic side elevation of one form of condenser which can be used in the embodiment of FIG. 8.

Two examples of condensers which can be used are shown in FIGS. 11 and 12. FIG. 11 shows an evaporate cooling arrangement wherein the gases leave the afterburner and travel along an inverted U-tube 601. Water is fed from reservoir 602 to spray heads 603 by pump 604 so as to rapidly cool the gas before it leaves the condenser.

FIG. 12 shows an indirect air cooled arrangement where gases enter the top of the condenser 700. A series of fans 701 create an air flow across the condenser thereby cooling the gases before they exit at the bottom.

Figure 13:
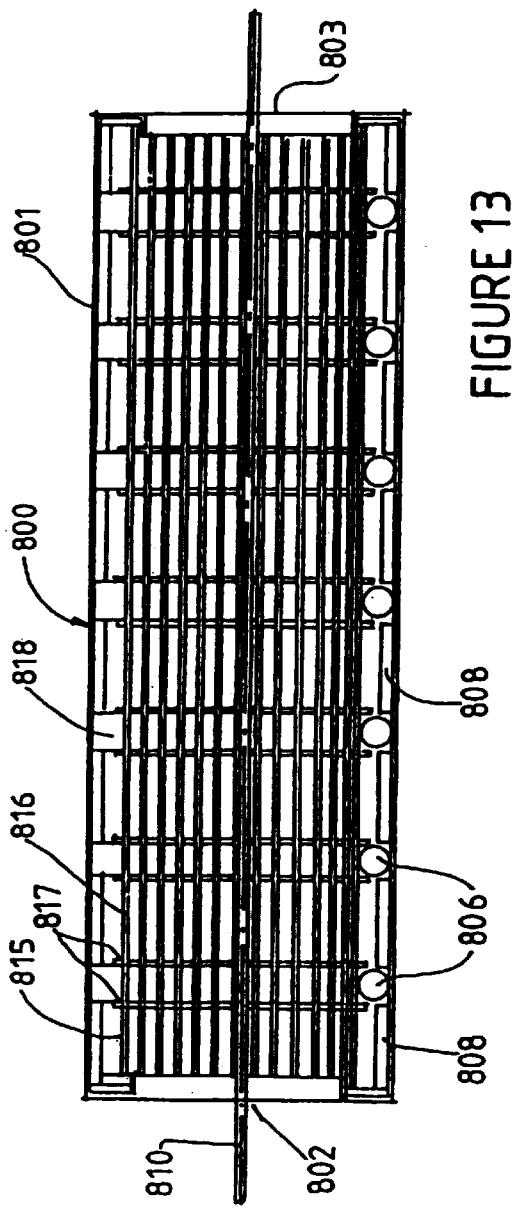
FIG. 13 is a sectional view of a retort according to one embodiment of the invention.
Figure 14:
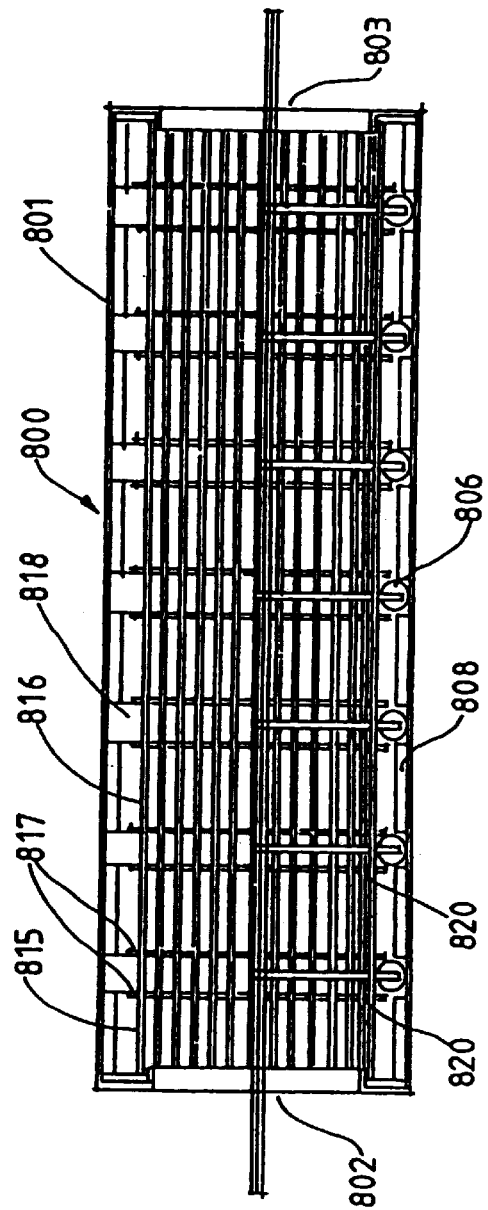
FIG. 14 is a modified form of the retort shown in FIG. 13.

FIGS. 13 and 14 show two arrangements of a retort which is suitable for use in various forms of apparatus described herein. Referring to the drawings the retort 800 includes a cylindrical body 801 which is mounted for rotation about its central axis for example on shaft 810. The retort 800 is disposed within a combustion chamber (not shown) the ends being sealed by ceramic seals (not shown). The retort has an infeed end 802 through contaminated material is fed into the retort and an outlet 803. A plurality of flights 808 are formed on the internal wall of the cylindrical body 801 the flights preferably having a 5° pitch.

The retort 800 further includes a cage 815 which is mounted within the cylindrical body 801. The cage 815 comprises a series of horizontal elements or rods 816 and a series of circumferential elements 817 connected together to form a unitary structure. The circumferential elements 817 are arranged in pairs on the region of the space between adjacent flytes 808. The cross-sectional diameter of the cage 815 is less than that of the internal cross-sectional diameter of cylindrical body 801 thereby forming an annular space 818 between the cylindrical body 801 and the cage 815.

The cage 815 is mounted for rotation and preferably is arranged to rotate in the opposite direction to that of the cylindrical body.

A plurality of balls 806 or like elements are disposed in the space 818 and are arranged to interact with contaminated material when the parts are rotating to break down the material and dislodge carbonised material which may form on the internal wall of the cylindrical body 801. The balls 806 are arranged in groups disposed at spaced intervals along the cylindrical body and are retained in position by respective pairs of circumferential elements 817.

In the embodiment shown in FIG. 14 there is further provided a series of arms 820 which can assist in moving the balls during rotation of the parts. The arms 820 can either rotate with the cage on shaft 810 or can be fixed to the internal wall of the cylindrical body 801.

The balls are arranged in groups each group which are held in place by the cage 815 and more particularly by the element 817 projecting into space 818. The groups of balls are being disposed at spaced intervals along the cylindrical body.

NB: For both contaminated solids or liquids, the flow of the combustion gases 52 through the retort may be either concurrent or countercurrent to the flow of the contaminated materials.

The recycling of the afterburner gases back into the retort 10 via the tube, pipe or conduit 55 minimises the energy input to the retort by the burners.

The provision of the heat fins or flights 56 on the pipe or conduit 55 not only increases the radiant surface area of the retort, but also assists in breaking up any large particles. In addition, the recycling pipe or conduit also helps create a convection environment with improves the volatile removal process, the convection improvement being created by the moving retort wall and by rotation of the pipe or conduit 55.

The energy sources for the burners 13 may include liquid petroleum gas, propane, natural gas, recycled hydrocarbons or other readily available energy sources.

The volatiles which may be treated by the method and apparatus of the present invention include hydrocarbons, organo-chlorides, arsenics, hydrogenated hydrocarbons, PCB's, coaltars and the like.

The operating temperature in the retort will be dependent on the volatile contaminants being treated and the retort may be operated at different temperatures to enable different volatiles to be treated on a fractional basis.

Various changes and modifications may be made to the embodiments described without departing from the present invention.

What is claimed is:

1. Apparatus for the treatment of volatile material(s) in contaminated material(s) including a retort assembly which includes a rotatable retort disposed at least partially within a combustion chamber with heating means to indirectly heat the rotatable retort; feeding means to feed the contaminated material(s) to the retort, said feeding means including a pretreatment means which in case where the materials are solids removes oversized particles or granules and in the case where the materials are liquids removes or minimizes the water content within the liquid; discharge means to discharge the treated material(s) from the retort; a high temperature filter which receives material from the retort; an afterburner; means to transfer the volatile material(s) given off as gases to the afterburner for combustion; and means for passing the combustion gases from the afterburner to the retort assembly to provide additional heat for use in the heating of contaminated material(s) in the retort, and means for passing the combustion gases through the retort.

2. Apparatus according to claim 1 including means for passing the combustion gases to the heating means.

3. Apparatus according to claim 1 or 2 wherein said heating means includes at least one burner for indirect heating of the retort.

4. A retort for use in the treatment of volatile material, the retort including a cylindrical body having an internal wall and which is mounted for rotation about its longitudinal axis, said body having an infeed end and an outlet, a combustion chamber, said cylindrical body being at least partially located within the combustion chamber, a plurality of balls disposed within the cylindrical body arranged to interact with contaminated material and dislodge carbonized material which may form on the internal wall of the cylindrical body; a cage within said cylindrical body, said balls being located in a space between said cage and the internal surface of said cylindrical body.

5. A retort according to claim 4 wherein said balls are arranged in groups, the groups being disposed at spaced intervals along the cylindrical body.

6. A retort according to claim 4 wherein said cage is mounted for rotation in the opposite direction to said cylindrical body.

7. Apparatus for the treatment of volatile material(s) in contaminated material(s) including a retort assembly which includes a rotatable retort said retort being rotatable about an axis at a small angle to the horizontal and disposed at least partially within a combustion chamber with heating means to indirectly heat the rotatable retort; feeding means to feed the contaminated material(s) to the retort, said feeding means including a pretreatment means which in the case where the materials are solids removes oversized particles or granules and in the case where the materials are liquids removes or minimizes the water content within the liquid; discharge means to discharge the treated material(s) from the retort; a high temperature filter which receives material from the retort; an afterburner; means to transfer the volatile material(s) given off as gases to the afterburner for combustion; and means for passing the combustion gases from the afterburner to the retort assembly to provide additional heat for use in the heating of contaminated material(s) in the retort.

8. Apparatus for the treatment of volatile material(s) in contaminated material(s) including a retort assembly which includes a rotatable retort disposed at least partially within a combustion chamber with heating means to indirectly heat the rotatable retort; feeding means to feed the contaminated material(s) to the retort, said feeding means including a pretreatment means which in the case where the materials are solids removes oversized particles or granules and in the case where the materials are liquids removes or minimizes the water content within the liquid; discharge means to discharge the treated material(s) from the retort; a high temperature filter which receives material from the retort; an afterburner; means to transfer the volatile material(s) given off as gases to the afterburner for combustion; and means for passing the combustion gases from the afterburner to the retort assembly to provide additional heat for use in the heating of contaminated material(s) in the retort and further including ceramic end seals to seal the ends of the retort to the combustion chamber surrounding the retort.

9. Apparatus for the treatment of volatile material(s) in contaminated material(s) including a retort assembly which includes a rotatable retort disposed at least partially within a combustion chamber with heating means to indirectly heat the rotatable retort, feeding means to feed the contaminated material(s) to the retort; said feeding means including a pretreatment means which in the case where the materials are solids removes oversized particles or granules and in the case where the materials are liquids removes or minimizes the water content within the liquid; discharge means to discharge the treated material(s) from the retort; a high temperature filter which receives material from the retort; an afterburner; means to transfer the volatile material(s) given off as gases to the afterburner for combustion; and means for passing the combustion gases from the afterburner to the retort assembly to provide additional heat for use in the heating of contaminated material(s) in the retort wherein when the contaminated materials are solid material(s) said pretreatment means includes grizzly means and rotary valve means to selectively feed the contaminated solids to the retort.

10. Apparatus according to claim 9 and further including mill means ahead of the grizzly means to reduce the size of the contaminated solids.

11. Apparatus for the treatment of volatile material(s) in contaminated material(s) including a retort assembly which includes a rotatable retort disposed at least partially within a combustion chamber with heating means to indirectly heat the rotatable retort; feeding means to feed the contaminated material(s) to the retort, said feeding means including a pretreatment means which in the case where the materials are solids removes oversized particles or granules and in the case where the materials are liquids removes or minimizes the water content within the liquid; discharge means to discharge the treated material(s) from the retort; a high temperature filter which receives material from the retort; an afterburner; means to transfer the volatile material(s) given off as gases to the afterburner for combustion; and means for passing the combustion gases from the afterburner to the retort assembly to provide additional heat for use in the heating of contaminated material(s) in the retort and wherein when said material comprises liquids, the pretreatment means includes water removal means to remove or minimize the water content of the contaminated liquids and producing heated water vapour in the process, and spray means to feed the concentrated liquids to the retort.

12. Apparatus according to claim 11 wherein the heated water vapour is transferred from the preheater to one of the high temperature filter and the afterburner.

13. Apparatus for the treatment of volatile material(s) in contaminated material(s) including a retort assembly which includes a rotatable retort disposed at least partially within a combustion chamber with heating means to indirectly heat the rotatable retort; feeding means to feed the contaminated material(s) to the retort, said feeding means including a pretreatment means which in the case where the materials are solids removes oversized particles or granules and in the case where the materials are liquids removes or minimizes the water content within the liquid; discharge means to discharge the treated material(s) from the retort, said discharge means including a rotary valve to selectively discharge the treated material to a product bin; a high temperature filter which receives material from the retort; an afterburner; means to transfer the volatile material(s) given off as gases to the afterburner for combustion; and means for passing the combustion gases from the afterburner to the retort assembly to provide additional heat for use in the heating of contaminated material(s) in the retort.

* * * * *

UNITED STATES PATENT AND TRADEMARK OFFICE
CERTIFICATE OF CORRECTION

| | | |
|---|---|---|
| PATENT NO. | : 6,213,030 B1 | Page 1 of 1 |
| APPLICATION NO. | : 09/051004 | |
| DATED | : April 10, 2001 | |
| INVENTOR(S) | : Struan Glen Robertson et al. | |

It is certified that error appears in the above-identified patent and that said Letters Patent is hereby corrected as shown below:

On the title page item [73] should appear as follows:

Assignees:    Tox Fee Systems Limited (AU)

Tox Free Systems, Inc. (US)

Signed and Sealed this

Seventh Day of October, 2008

JON W. DUDAS
*Director of the United States Patent and Trademark Office*